(12) United States Patent
Kliebhan et al.

(10) Patent No.: US 11,991,318 B1
(45) Date of Patent: *May 21, 2024

(54) ENHANCED CALLER INFORMATION USED FOR NUISANCE CALLER MANAGEMENT (71) Applicant: FIRST ORION CORP., North Little Rock, AR (US)

(72) Inventors: Daniel Francis Kliebhan, Henderson, NV (US); Scott D. Hambuchen, Little Rock, AR (US); Mark Himelfarb, Little Rock, AR (US); Joshua Harrison Lange, Seattle, WA (US)

(73) Assignee: FIRST ORION CORP., North Little Rock, AR (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/221,864

(22) Filed: Apr. 5, 2021

Related U.S. Application Data (62) Division of application No. 15/716,158, filed on Sep. 26, 2017, now Pat. No. 11,272,063.

(60) Provisional application No. 62/399,853, filed on Sep. 26, 2016.

(51) Int. Cl.
H04L 65/10 (2022.01)
H04M 3/42 (2006.01)
H04M 7/00 (2006.01)
H04L 65/1104 (2022.01)
H04M 3/436 (2006.01)
H04M 3/533 (2006.01)
H04M 3/54 (2006.01)

(52) U.S. Cl.
CPC ..... *H04M 7/0075* (2013.01); *H04M 3/42059* (2013.01); *H04M 3/42102* (2013.01); *H04L 65/1104* (2022.05); *H04M 3/436* (2013.01); *H04M 3/533* (2013.01); *H04M 3/543* (2013.01); *H04M 7/0063* (2013.01)

(58) Field of Classification Search
CPC ............ H04L 61/4511; H04L 61/4557; H04L 65/1069; H04L 65/1079; H04L 65/1104; H04M 2203/2038; H04M 3/42059; H04M 3/42102; H04M 3/42136; H04M 3/436; H04M 3/533; H04M 3/543; H04M 7/0063; H04M 7/0075
See application file for complete search history.

(56) References Cited

U.S. PATENT DOCUMENTS

| | | |
|---|---|---|
| 5,802,160 A | 9/1998 | Kugell et al. |
| 7,613,286 B2 | 11/2009 | Hong |
| 8,116,808 B2 | 2/2012 | Amine |
| 8,325,905 B2 | 12/2012 | Gregorat et al. |
| 9,143,611 B2 | 9/2015 | Hartley et al. |
| 9,763,144 B2 | 9/2017 | LaBauve et al. |
| 9,904,725 B1 | 2/2018 | Hedges et al. |
| 2004/0028208 A1 | 2/2004 | Carnazza et al. |

(Continued)

OTHER PUBLICATIONS https//en.wikipedia.org/wiki/Payload_(computing), last downloaded Jul. 22, 2019.

*Primary Examiner* — Phuc H Tran (57) ABSTRACT

A system may include one or more of a called device, a calling device, configured to call the called device, and a network module. The network module is configured to process incoming call information of a call placed to the called device and configured to route the call to a destination based on preferences of the called device.

18 Claims, 4 Drawing Sheets

(56) References Cited

U.S. PATENT DOCUMENTS

| | | |
|---|---|---|
| 2006/0072726 A1 | 4/2006 | Klein et al. |
| 2007/0283006 A1 | 12/2007 | Hong |
| 2008/0045186 A1* | 2/2008 | Black ................ H04L 65/1101 455/413 |
| 2008/0285735 A1* | 11/2008 | Ravishankar ........... H04L 51/04 379/207.02 |
| 2009/0067408 A1* | 3/2009 | Leppainen .......... H04L 65/1094 709/229 |
| 2009/0190734 A1 | 7/2009 | White et al. |
| 2009/0258634 A1 | 10/2009 | Amine |
| 2010/0158225 A1* | 6/2010 | Rogers ................ H04M 15/00 379/207.14 |
| 2012/0015639 A1 | 1/2012 | Trivi et al. |
| 2015/0030142 A1 | 1/2015 | Wuthnow et al. |
| 2015/0086001 A1* | 3/2015 | Farrand ............. H04M 3/42153 379/210.02 |
| 2016/0360036 A1* | 12/2016 | Ansari .................... H04M 1/57 |
| 2017/0126750 A1 | 5/2017 | Ku et al. |
| 2017/0171251 A1 | 6/2017 | Ku et al. |

\* cited by examiner

Fig. 1 Conventional Art Call Routing Network Configuration

Fig. 2 Improved Calling Configuration

Fig. 3 Network Module Block Diagram

Fig. 4 Preference-Based Call Process

US 11,991,318 B1

ENHANCED CALLER INFORMATION USED FOR NUISANCE CALLER MANAGEMENT

CROSS-REFERENCE TO RELATED APPLICATION

This application is a divisional of U.S. patent application Ser. No. 15/716,158, filed on Sep. 26, 2017, which claims priority to earlier filed provisional application No. 62/399,853 filed Sep. 26, 2016 and entitled "ENHANCED CALLER INFORMATION USED FOR NUISANCE CALLER MANAGEMENT", the entire contents of which are hereby incorporated by reference.

TECHNICAL FIELD OF THE APPLICATION

This application relates to caller identification information and related call management with a particular caller and more particularly to using customized caller management functions.

BACKGROUND OF THE APPLICATION

Conventionally, a caller and a call recipient may communicate over a web-based network by using a call routing configuration that can translate a phone number, identifier, IP address or other known user device parameters to routing information. For example, a calling party may call a called party by submitting the called party telephone number to a network device for call routing and call translation. The information may be used to route the call to a domain name server (DNS Server) especially in the call routing operations of an Internet protocol (IP) based network. However, the call routing options are limited at the call routing device as the only option is generally to route the call to the called device's carrier network or respond with an error if the called party device is not recognizable.

SUMMARY OF THE APPLICATION

One example embodiment of the present application may include a system including one or more of a called device, a calling device, configured to call the called device, and a network module. The network module is configured to process incoming call information of a call placed to the called device and configured to route the call to a destination based on preferences of the called device.

Another example embodiment of the present application may provide a method that includes one or more steps of receiving a call including a called device identifier corresponding to a called device and a calling device identifier corresponding to a calling device, submitting an enhanced information query including the calling device identifier, determining a preference based on the calling device identifier to route the call, and routing the call based on the preference.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide enhanced caller information being used during a call conducted by a calling party device and a called party device. The types of enhanced information may include audio, text, images, video, web links, application functions, promotions, brochures, etc. The called device may communicate with a third party application, hardware device, remote server, database, etc., to retrieve the enhanced information prior to or during a call session.

Figure 1:
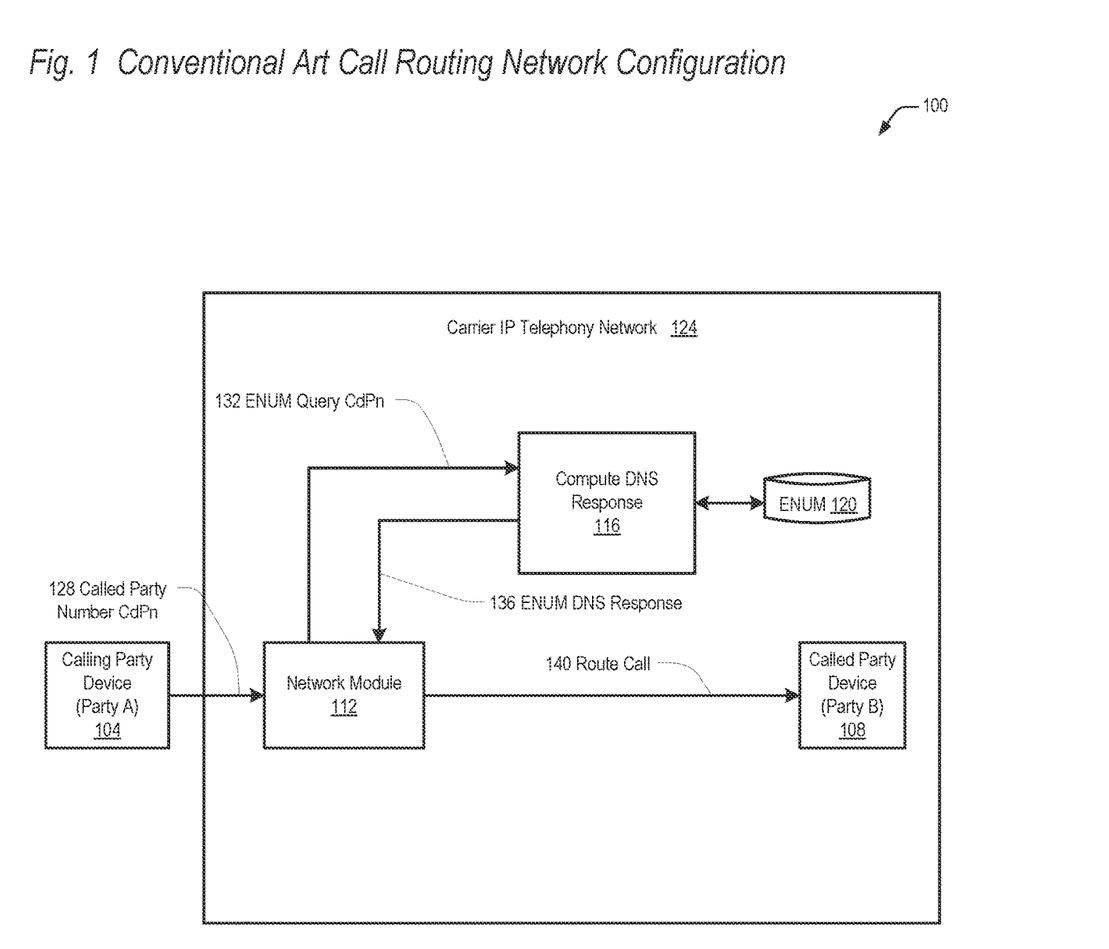
FIG. 1 illustrates a block diagram of a conventional art call routing network configuration.

FIG. 1 illustrates a block diagram of a conventional art call routing network configuration 100. Referring to FIG. 1, the network 100 includes two basic parties including a calling party or calling party device 104 operated by an automated computer or user. The calling device 104 may be a computer operated calling device, a phone, a smartphone or any other dialing device. A called party device 108 corresponding to a called user are recipients of a call from the calling device 104.

In the conventional approach, the call is routed through a network module 112 based solely on the called party number 128, for instance, the carrier IP telephony network 124 calculates a DNS response 116 by making an ENUM lookup into ENUM database 120 in order to provide an ENUM DNS response 136 and route the call 140.

Figure 2:
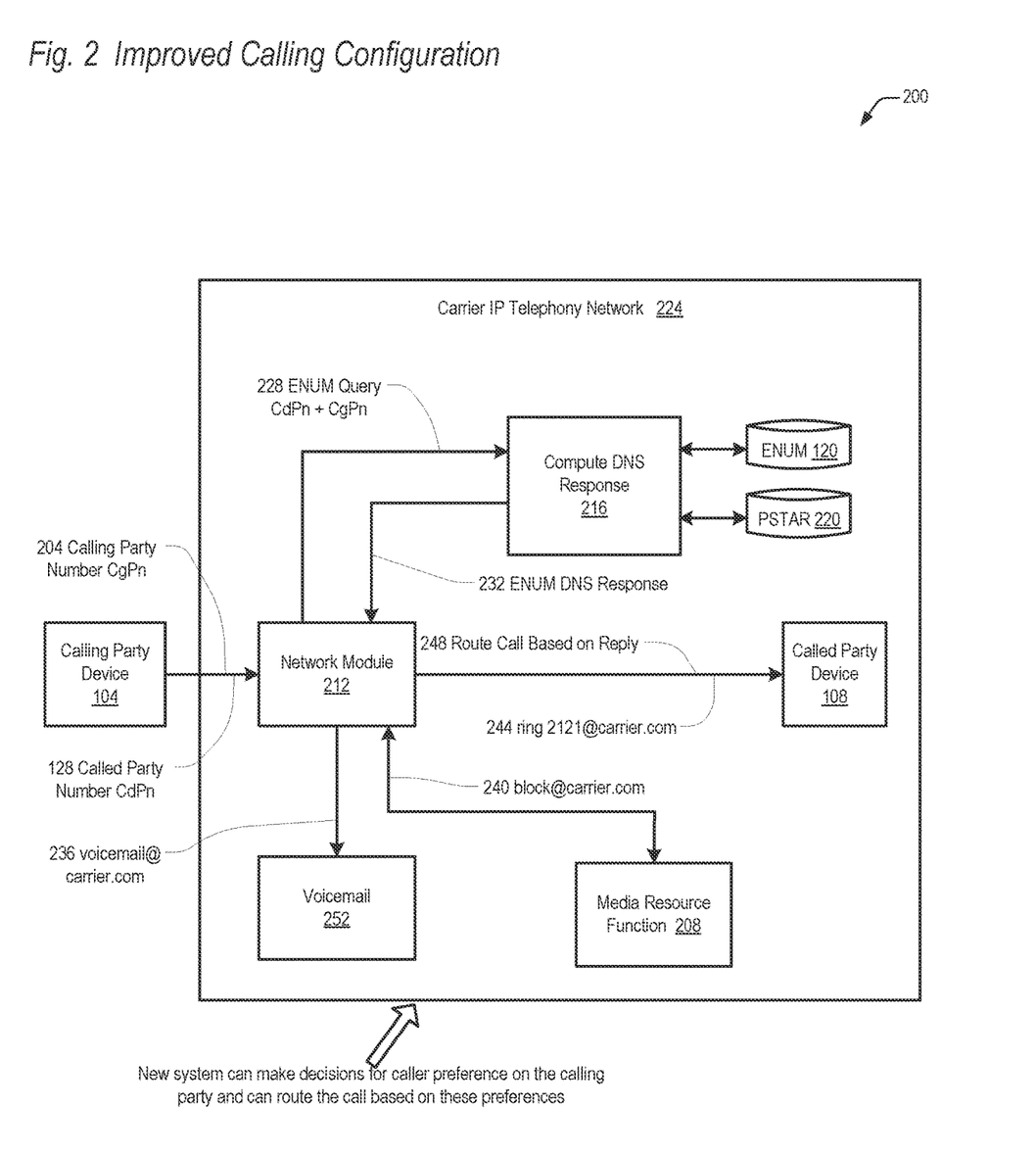
FIG. 2 illustrates a block diagram of an improved calling configuration in accordance with embodiments of the present application.

FIG. 2 illustrates a block diagram of an improved calling configuration 200 in accordance with embodiments of the present application. The application of the present disclosure uses a modified ENUM payload that also includes a calling party number (CgPn) 204 such that the ENUM response calculation can use both the CgPn 204 and a called party number (CdPn) 128 to determine the resultant response.

While the terms include a "calling party number" and "caller party number", such information may be DNS addresses or other identifiers for a user (e.g., a Skype endpoint). The terms may also be referred to as a calling party identifier, called party identifier, etc., such as a phone number, IP address, etc. These identifiers may be translated by the underlying network to phone numbers or other information used to identify parties.

The fact that both party numbers can be used to formulate a response provides a nuisance call application with the ability to determine whether the calling party 104 is an unwanted call, and assign an ENUM response to change the standard call routing disposition and thus alter the standard call flow. One embodiment uses the calling party number 204, and if the caller 104 is a scammer or telemarketer or someone from whom the called party 108 have indicated that is not allowed to ring the phone, then an alternate ENUM response 232 is applied to redirect the call per a preference, instead of a standard DNS response 136.

A network module 212 that queries the ENUM database 120 for ENUM DNS response 232 can vary and may dictate how the application logic would respond to facilitate the desired call disposition routing. Some ways of computing a DNS response 216 may include a null IP address to indicate block, a SIP URI with redirect numbers, use of specific regex, enhanced DNS options, etc.

An ENUM query 228 is modified to include both the calling party number CgPn 204 as well as the called party number 128. The calling party number CgPn 204 may include IP addresses of a peering partner, SIP headers, or other signaling attributes. With such data included in the ENUM query 228 payload, a network module 212 application can then interrogate a media resource function 208 at the edge of the network 224 to determine if the called party 108 wants to accept the incoming call, which saves network resources. Also, with the analytic data provided by the application, categories of calling parties 104 can also be denied/redirected. Examples of categories include i.e., scam, spam, robocalls, telemarketers, etc. An edge-located network module 212 that routes calls based on ENUMng responses 232, would use an endpoint address returned by an ENUM element as a direction to further route the call or add appropriate attributes to the call (e.g., headers).

A SPAM score may be computed by applying multiple modeling techniques, which include machine learning, statistics and heuristics, against various real-time data variables from call activities, in conjunction with historical call trends, of callers. Some of the data features analyzed include call traffic patterns, called number tracking, user feedback, and other empirical data. Instead of a conventional approach of routing calls based on only the called party number 128 being used to compute a DNS response 232, the application can use the called party number 128 and the calling party number 204 during the call determination and routing procedure.

The response calculation is based on the calling party 104 (party A). If this party (A) is a known bad actor or party (B) (the called party 108), has expressly identified this caller (A) 104 as a party that requires alternate handling options other than direct routing, or other rules exist, e.g., based on traffic peer agreements between operators for number A and number B, operator settings for a given number, etc., the response from the application is an altered ENUM DNS response 232. Otherwise the standard ENUM DNS response 136 is returned and normal routing proceeds. The resultant response can vary based on carrier and based on subsequent element addressing.

The network module 212 that queries 228 the ENUM 120 for DNS response 232 can vary and may dictate how the application logic would respond to facilitate the desired call disposition routing. Some ways may be a null IP address to indicate block, a SIP URI with redirect numbers, use of specific regex, enhanced DNS options, etc.

In FIG. 2, the block@carrier.com 240 and voicemail@carrier.com 236 are basic ways to demonstrate the change in routing using simple URIs. For example an ENUM for query 228 for 16305551212 may normally respond as "Response A" but if special handling is to be applied to this number would respond with "Response B" 232. Query: $ORIGIN 2.1.2.1.5.5.5.0.3.6.1.e164.arpa. Response A: IN NAPTR 100 10 "u" "E2U+sip" "!^(.*)$!sip:\\1@mynum.net!", Result: sip:16305551212@mynum.net, Response B: IN NAPTR 100 10 "u" "E2U+sip" "!^(.*)$!sip:voicemail@carrier.com!", Result: sip:voicemail@carrier.com. To the example, a carrier could set up a DNS route to voicemail@carrier.com 236 such that all calls that come back with this DNS will go to voicemail 252.

FIG. 2 illustrates a Media Resource Function (MRF) 208. This is added to demonstrate the ability to add media (audio or video) to the response call disposition and interact with either party to establish context for the call, determine more information about the calling party 104 or obtain permission to proceed with the call. A media resource function (MRF) 208 can be added to call streams to play recordings, collect DTMF responses, and route calls, drop calls, etc. The MRF 208 generally resides with the carrier IP telephony network 224. For example, the recording "The number you have reached is not available, please retry your call later" is a MRF 208 function used to play the message and drop the call. In this case, the DNS response 232 is altered to send the call to the MRF 208 and play the specified message. A payload may include attributes permitting to set call priority, urgency, sensitivity, etc., permitting the carrier of the B party 108 to properly set the call disposition as indicated by ENUMng response 232.

The ENUMng's response 232 may result in certain call attributes such as a Caller ID being altered to indicate specific information relevant to the call, with or without changing the call's disposition. Such information will be used by Party B's UE (user equipment) 108 to inform the user about the call's purpose or context, apply specific rules as set by the Party B's UE 108, e.g. urgent call handling.

Figure 3:
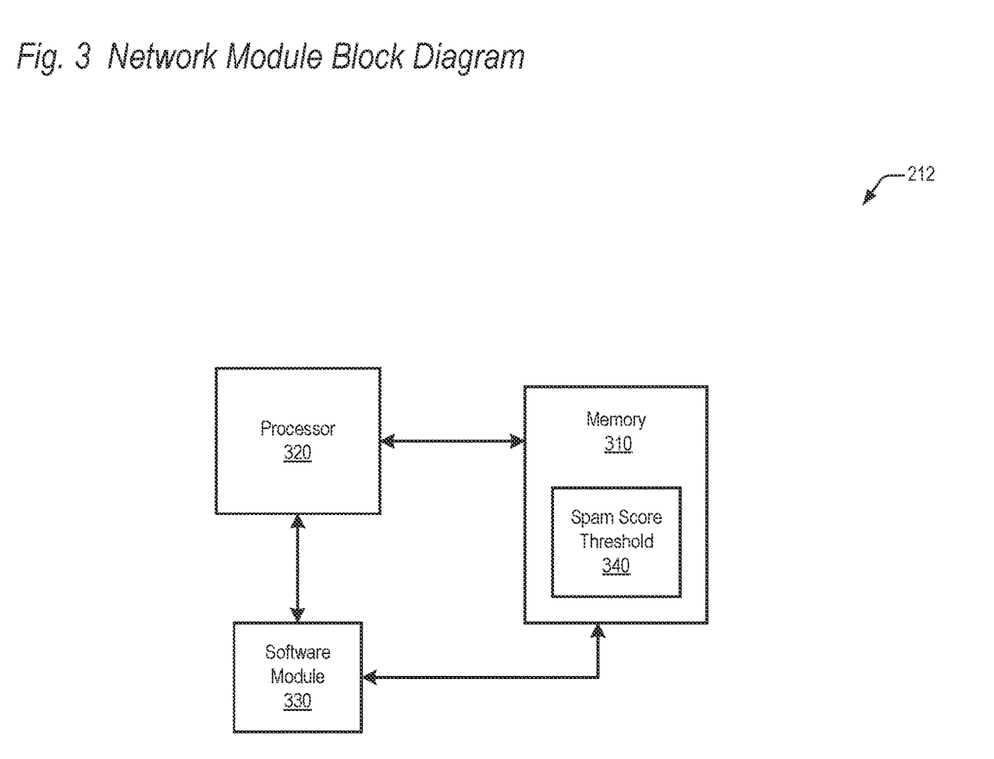
FIG. 3 illustrates a block diagram of a network module in accordance with embodiments of the present application.

Example embodiments provide a nuisance call management application and platform. In one example, a modified ENUM (ENUMng) lookup operation is performed for routing calls that have exceeded defined spam score thresholds or categories 340, which are routed to trunks with logic to perform the required call disposition. Call dispositions can include features such as block, route to voicemail and/or route to another destination or another party. Other options may include to enter a pin, play a message, etc. ENUM is a protocol developed by the IETF that uses the Internet DNS system to translate ordinary telephone numbers into IP addressing schemes. In general, to route calls within an IP telephony network, specifically session initiation protocol (SIP) calls, telephone numbers must be translated to a routable DNS, a SIP URI, for example. As a result, all terminating calls require an ENUM 120 lookup/response. Calls can also be forwarded to home phones, work phones, or other designated devices. The call disposition may, for example, not be altered, however call metadata, such as a caller identifier or ID may change. This will be performed by B party's User Equipment (UE).

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network module 212, which may represent any of the above-described network components of the other figures.

As illustrated in FIG. 3, a memory 310 and a processor 320 may be discrete components of the network entity that are used to execute an application 330 or set of operations. The application 330 may be coded in software in a computer language understood by the processor 320, and stored in a computer readable medium, such as, the memory 310. The memory 310 may also include stored records for any number of spam score thresholds 340, where spam score thresholds are tracked in order for the network module 212 to understand whether or not a call should be considered spam. The computer readable medium may be a non-transitory computer readable medium that includes tangible hardware components in addition to software stored in memory. Furthermore, a software module 330 may be another discrete entity that is part of the network module 212, and which contains software instructions that may be executed by the processor 320. In addition to the above noted components of the network module 212, the network module 212 may also have a transmitter and receiver pair (not shown) configured to receive and transmit communication signals.

Figure 4:
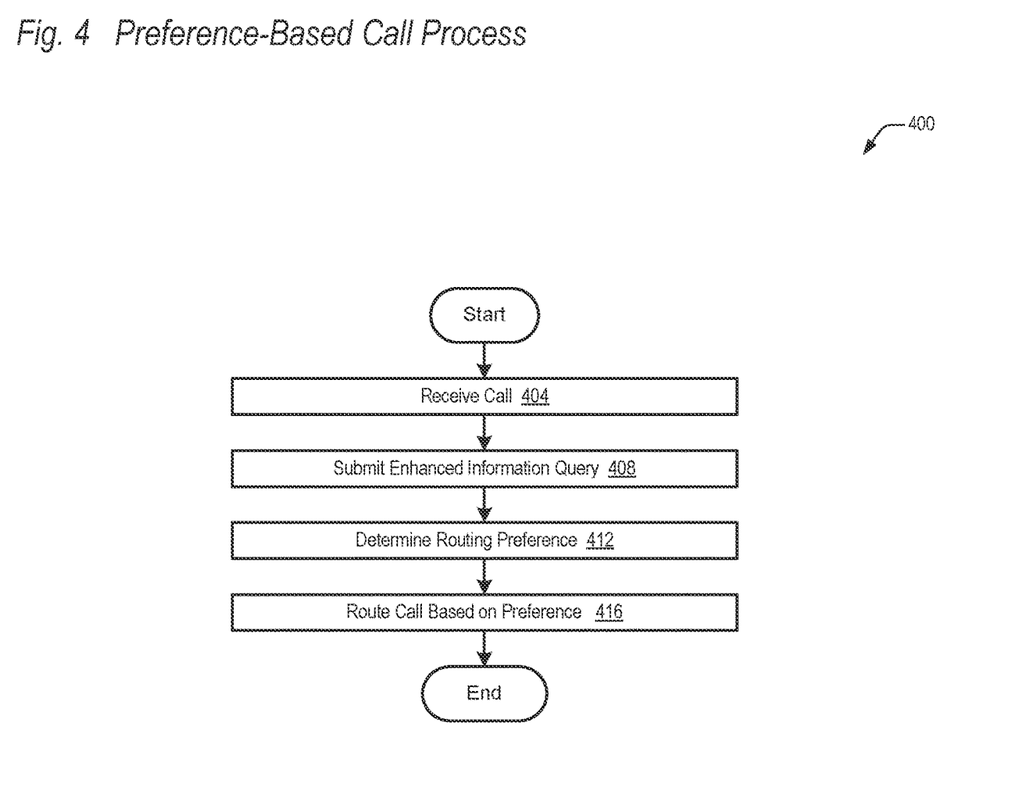
FIG. 4. Illustrates a flowchart of a preference-based call process in accordance with embodiments of the present application.

FIG. 4 illustrates a flowchart of a preference-based call routing process 400 in accordance with the present invention. Flow begins at block 404. At block 404, a network module 212 receives a call from a calling party device 104. The call includes both a calling party number 204 and a called party number 128 for the called party device 108. Flow proceeds to block 408.

At block 408, the network module 212 submits an enhanced information query 228 to a DNS response calculator 216. The DNS response calculator 216 obtains needed data from ENUM 120 and PSTAR 220 to generate a DNS response 232 to the network module 212. Flow proceeds to block 412.

At block 412, the network module 212 determines routing preferences for the call. In one embodiment, the routing preferences route the call 236 to voicemail 252. In another embodiment, the routing preferences route the call 240 to a media resource function 208. In some embodiments, the MRF 208 blocks the call. In other embodiments, the MRF 208 may provide an audio response as previously disclosed. Flow proceeds to block 416.

At block 416, the network module 212 routes the call 244, 248 based on the preferences. Flow ends at block 416.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of a system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving a call, the call comprising a called device identifier corresponding to a called device and a calling device identifier corresponding to a calling device;
    submitting an enhanced information query comprising the calling device identifier and the called device identifier;
    determining whether the called device will accept the call based on a result of the enhanced information query;
    determining a call routing preference based on the calling device identifier and the called device identifier to route the call to a different destination than the called device when the call exceeds a spam score threshold;
    routing the call based on the preference; and
    providing the called device with information about the purpose or context of the call.

2. The method of claim 1, wherein the submitting an enhanced information query comprises:
    performing a modified ENUM lookup operation.

3. The method of claim 2, wherein the performing the modified ENUM lookup operation further comprises:
    utilizing a modified ENUM payload comprising the calling device identifier and an ENUM response comprising the calling device identifier and the called device identifier.

4. The method of claim 3, wherein the calling device identifier of the modified ENUM payload comprises:
    one or more IP addresses of a peering partner or one or more SIP headers.

5. The method of claim 4, further comprising:
    interrogating a media resource function to determine if the called device will accept the call, wherein the media resource function adds audio or video to calls, establishes context for calls, and determines whether to proceed with calls.

6. The method of claim 4, wherein an underlying network translates the calling device identifier and the called device identifier to phone numbers or other information used to identify parties.

7. The method of claim 1, wherein the preference comprises:
    blocking the call, routing the call to voicemail, routing the call to a different destination, or routing the call to another party.

8. The method of claim 7, wherein the preference further comprises:
    entering a PIN or playing a message.

9. The method of claim 7, wherein the routing the call to the different destination comprises:
    forwarding the call to one of a home phone, a work phone, or another designated device.

10. A non-transitory computer readable medium comprising instructions that when read by a processor, cause the processor to perform:
    receiving a call, the call comprising a called device identifier corresponding to a called device and a calling device identifier corresponding to a calling device;
    submitting an enhanced information query comprising the calling device identifier and the called device identifier;
    determining whether the called device will accept the call based on a result of the enhanced information query;
    determining a call routing preference based on the calling device identifier and the called device identifier to route the call to a different destination than the called device when the call exceeds a spam score threshold;
    routing the call based on the preference; and
    providing the called device with information about the purpose or context of the call.

11. The non-transitory computer readable medium of claim 10, wherein the submitting an enhanced information query comprises:
    performing a modified ENUM lookup operation.

12. The non-transitory computer readable medium of claim 11, wherein the performing the modified ENUM lookup operation further comprises:
    utilizing a modified ENUM payload comprising the calling device identifier and an ENUM response comprising the calling device identifier and the called device identifier.

13. The non-transitory computer readable medium of claim 12, wherein the calling device identifier of the modified ENUM payload comprises:
    one or more IP addresses of a peering partner or one or more SIP headers.

14. The non-transitory computer readable medium of claim 13, further comprising:
    interrogating a media resource function to determine if the called device will accept the call, wherein the media resource function adds audio or video to calls, establishes context for calls, and determines whether to proceed with calls.

15. The non-transitory computer readable medium of claim 13, wherein an underlying network translates the calling device identifier and the called device identifier to phone numbers or other information used to identify parties.

16. The non-transitory computer readable medium of claim 10, wherein the preference comprises:

blocking the call, routing the call to voicemail, routing the call to a different destination, or routing the call to another party.

17. The non-transitory computer readable medium of claim 16, wherein the preference further comprises:
   entering a PIN or playing a message.

18. The non-transitory computer readable medium of claim 16, wherein the routing the call to the different destination comprises:
   forwarding the call to one of a home phone, a work phone, or another designated device.

\* \* \* \* \*